Patented Nov. 7, 1933

1,934,091

UNITED STATES PATENT OFFICE 1,934,091

METHOD OF MOLDING NONPLASTIC METALLIC OXIDES

Reinhold Reichmann, Berlin, and Hans Kohl, Berlin-Siemensstadt, Germany, assignors to Siemens & Halske Aktiengesellschaft, Siemensstadt, near Berlin, Germany, a corporation of Germany No Drawing. Application October 18, 1932, Serial No. 638,330, and in Germany October 29, 1931

3 Claims. (Cl. 18—47.5)

Our invention relates to a method of molding non-plastic metallic oxides.

It has hitherto been common practice to manufacture shaped bodies consisting of non-plastic metallic oxides by adding to the same loamy or other binding agents which impart to the substance to be treated a definite plasticity and by then molding them under pressure. Other methods heretofore known consist in adding acid to the metallic oxides and in molding the mass by pouring it into the mold. When molding particularly articles in quantities, it is necessary to have always a large number of molds available. The settling of the moldable mass in the molds requires a relatively long time.

Loamy and other binding agents such as dextrin, water glass and the like, which impart a definite plasticity to the substance to be treated and which permit of a shaping by pressing are unsuitable, since it is not possible by the use of these binding agents to obtain pure and uniformly compact bodies of great mechanical strength and high electric resistance.

According to the invention the moldability of non-plastic metallic oxides by the pressing process is rendered possible by adding dilute acid which has been heretofore employed only in molding suspensions. In order to obtain high grade products one proceeds in the following manner:

The metallic oxide to be treated is calcined until it begins to crystallize and then ground to a fineness of grain of 2–15$\mu$. The ground material is disintegrated into its finest constituents by adding thereto dilute acid to an amount depending upon the pH-valve of the aqueous suspension of metallic oxide and by simultaneously heating and stirring it; whereupon the moisture is removed to such an extent as to result in a crumbly mass which is capable of being molded by pressing, ramming and shaking.

In view of the great importance which a thoroughly and carefully prepared raw material has for the method, it is essential that the metallic oxide be calcined till it begins to crystallize. In this manner a starting material is obtained which may be activated in the desired way by the addition of acid so that during the drying process bodies of considerable compactness and of sufficient strength when dried result whose crystallization during the baking process is continued until the bodies obtain a compact and homogeneous crystalline texture.

The raw material is preferably ground in a mill which is lined with the same or a similar substance in order to avoid contaminations by the grinding process. The grinding is continued until a fineness of grain of 2–15$\mu$ is attained. During the grinding it is of advantage that the different sizes of granulation are present in an approximately uniform mixture, since in this manner the stability of the form during the firing process is increased.

When adding dilute acid, for instance hydrochloric acid, it is essential that the formation of tiny lumps be prevented and that the suspension of the particles in the acid be as complete as possible. The quantity of acid depends upon the pH-value of the aqueous suspension, which is ascertained prior to adding the acid. If the pH-value lies below 7, an acid of less concentration should be added, than if the pH-value lies above 7. A convenient final concentration of the mass to be molded is, for instance, for aluminum oxide, 6–8 parts of actual hydrochloric acid content to 100 parts by weight of dry substance. The mixture is stirred and preferably heated at the same time, for instance, to a temperature of about 60° C. The stirring and heating must be continued for a considerable time, preferably for several days, in order to attain a suspension as complete as possible and a disintegration of the dry substance into its finest constituents.

A portion of the water is removed from the mass thus prepared in the filter presses or plaster molds until a crumbly mass results which still contains about 5% moisture. Also in this mass the adsorbed acid ions still adhere to the single particles, i. e., the single particles are activated in the above described manner.

The crumbly mass is highly plastic so that it may be molded by pressing, ramming and shaking without the use of binding agents for rendering the same plastic. Owing to the acid employed, it is preferable to use acid proof press molds, for instance, molds consisting of tempered beryllium alloys, particularly of copper beryllium. The pressure applied during the pressing process is preferably increased gradually so as to attain a uniform distribution of the pressure through the entire mass, and amounts to about 5 tons.

In order to facilitate the removal of the pressings from the mold a small quantity of highly viscous oil is added to the mass before it is cast into the mold.

The pressings removed from the form have already a great strength so that they may be easily handled. They are then sintered depending upon the purpose of employment for which they are destined. Particularly resistant and compact bodies are obtained when sintering above 1600° C., especially at a temperature of 1750° C. In view of the intensive disintegration of the single particles by the above mentioned pretreatment, bodies of completely compact and homogeneous texture are obtained which also have great disruptive electric strength. Such uniformly compact and homogeneous bodies cannot be obtained by the use of any of the binding agents hitherto employed for molding the mass.

We claim as our invention:

1. In a method for molding non-plastic metallic oxides and a mixture thereof, the steps which comprise grinding the metallic oxide which has been calcined until it begins to crystallize, to a finely divided state, adding thereto dilute acid to an amount depending upon the pH-value of the aqueous suspension of the metallic oxide and simultaneously heating and stirring it, and removing the moisture from the mass till it becomes crumbly so as to mold it by a mechanical process.

2. In a method for molding non-plastic metallic oxides and mixtures thereof, the steps which comprise grinding the aluminum oxide which has been calcined until it begins to crystallize to a fineness of grain of 2–15 $\mu$, adding thereto dilute acid to an amount depending upon the pH-value of the aqueous suspension of the aluminum oxide and simultaneously heating and stirring it, removing the moisture from the mass till it becomes crumbly and shaking the mass to its desired form.

3. The method of molding non-plastic metallic oxides and mixtures thereof which consists in grinding the aluminum oxide which has been calcined until it begins to crystallize, to a fineness of grain of 2–15 $\mu$, adding thereto dilute acid to an amount depending upon the pH-value of the aqueous suspension of the aluminum oxide and simultaneously heating and stirring it, removing the moisture from the mass until it becomes crumbly, adding a slight amount of highly viscous oil to the mass and molding the mass thus prepared in molds of tempered beryllium alloy by shaking.

REINHOLD REICHMANN.
HANS KOHL.